US008218697B2

(12) United States Patent
Guess et al.

(10) Patent No.: US 8,218,697 B2
(45) Date of Patent: Jul. 10, 2012

(54) ITERATIVE INTERFERENCE CANCELLATION FOR MIMO-OFDM RECEIVERS

(75) Inventors: Tommy Guess, Lafayette, CO (US); Michael L. McCloud, Boulder, CO (US); Louis L. Scharf, Fort Collins, CO (US)

(73) Assignee: Rambus Inc., Sunnyvale, CA (US)

( * ) Notice: Subject to any disclaimer, the term of this patent is extended or adjusted under 35 U.S.C. 154(b) by 165 days.

(21) Appl. No.: 12/707,507

(22) Filed: Feb. 17, 2010

(65) Prior Publication Data

US 2010/0208854 A1    Aug. 19, 2010

Related U.S. Application Data

(63) Continuation of application No. 11/475,458, filed on Aug. 28, 2006, now abandoned.

(60) Provisional application No. 60/736,204, filed on Nov. 15, 2005.

(51) Int. Cl.
*H03D 1/04* (2006.01)
*H03K 5/01* (2006.01)

(52) U.S. Cl. ........ 375/346; 375/144; 375/147; 375/148; 375/260; 375/267; 375/348; 375/349; 375/350

(58) Field of Classification Search .................. 375/316, 375/324, 340, 346–349, 144, 147, 148, 260, 375/267, 350
See application file for complete search history.

(56) References Cited

U.S. PATENT DOCUMENTS

| 5,271,042 | A | 12/1993 | Borth et al. | 375/101 |
|---|---|---|---|---|
| 5,423,045 | A | 6/1995 | Kannan et al. | 395/750 |
| 5,467,368 | A | 11/1995 | Takeuchi et al. | 375/206 |
| 5,553,062 | A | 9/1996 | Schilling et al. | 370/18 |
| 5,568,411 | A | 10/1996 | Batruni | 364/724.19 |
| 5,606,560 | A | 2/1997 | Malek et al. | 370/347 |
| 5,644,592 | A | 7/1997 | Divsalar et al. | 375/206 |
| 5,761,237 | A | 6/1998 | Petersen et al. | 375/200 |
| 6,157,685 | A | 12/2000 | Tanaka et al. | 375/346 |
| 6,161,209 | A | 12/2000 | Moher | 714/780 |
| 6,175,588 | B1 | 1/2001 | Visotsky et al. | 375/148 |
| 6,192,067 | B1 | 2/2001 | Toda et al. | 375/144 |

(Continued)

FOREIGN PATENT DOCUMENTS

EP    1179891    2/2002

(Continued)

OTHER PUBLICATIONS

Response to Notice to File Corrected Application Papers dated May 19, 2010 re U.S. Appl. No. 12/731,960. 63 Pages.

(Continued)

*Primary Examiner* — Chieh M Fan
*Assistant Examiner* — Sophia Vlahos
(74) *Attorney, Agent, or Firm* — Barcelo, Harrison & Walker LLP

(57) ABSTRACT

An OFDMA-MIMO receiver performs a recursive interference cancellation across several correlated subbands and several receive antenna elements to demodulate complex source symbols for several users that have been coded across several subbands and transmit antennas. The iterative parallel interference canceller (PIC) is configured to work in the presence of both spatial and frequency structure introduced by the transmitter space-frequency mapping and the actual frequency selective wireless channel. The interference canceller uses mixed decisions, confidence weights, and stabilizing step sizes in a PIC receiver, which may be used with a successive decoding architecture in a receiver that employs a combination of modulation level interference cancellation with successive decoding.

30 Claims, 8 Drawing Sheets

U.S. PATENT DOCUMENTS

| | | | |
|---|---|---|---|
| 6,208,683 B1 | 3/2001 | Mizuguchi et al. | 375/140 |
| 6,307,901 B1 | 10/2001 | Yu et al. | 375/341 |
| 6,320,919 B1 | 11/2001 | Khayrallah et al. | 375/347 |
| 6,377,611 B1* | 4/2002 | Hwang | 375/140 |
| 6,404,760 B1 | 6/2002 | Holtzman et al. | 370/342 |
| 6,414,949 B1 | 7/2002 | Boulanger et al. | 370/335 |
| 6,426,973 B1 | 7/2002 | Madhow et al. | 375/231 |
| 6,466,611 B1 | 10/2002 | Bachu et al. | 375/144 |
| 6,496,534 B1 | 12/2002 | Shimizu et al. | 375/147 |
| 6,522,683 B1 | 2/2003 | Smee et al. | 375/144 |
| 6,529,495 B1 | 3/2003 | Aazhang et al. | 370/342 |
| 6,535,554 B1 | 3/2003 | Webster et al. | 375/233 |
| 6,546,043 B1 | 4/2003 | Kong | 375/148 |
| 6,570,919 B1 | 5/2003 | Lee | 375/233 |
| 6,594,318 B1 | 7/2003 | Sindhushayana | 375/262 |
| 6,594,618 B1 | 7/2003 | Azencott | 702/182 |
| 6,647,078 B1 | 11/2003 | Thomas et al. | 375/349 |
| 6,678,508 B1 | 1/2004 | Koinpillai et al. | 455/132 |
| 6,687,723 B1 | 2/2004 | Ding | 708/322 |
| 6,690,723 B1 | 2/2004 | Gose et al. | 375/233 |
| 6,711,219 B2 | 3/2004 | Thomas | 375/346 |
| 6,714,585 B1 | 3/2004 | Wang et al. | 375/148 |
| 6,724,809 B2 | 4/2004 | Reznik | 375/148 |
| 6,741,634 B1 | 5/2004 | Kim et al. | 375/144 |
| 6,754,340 B1 | 6/2004 | Ding | 379/406.08 |
| 6,816,541 B1 | 11/2004 | Schmidl | 375/148 |
| 6,839,390 B2 | 1/2005 | Mills | 375/341 |
| 6,850,772 B2 | 2/2005 | Mottier | 455/526 |
| 6,870,919 B2 | 3/2005 | Dobler | 375/233 |
| 6,909,742 B1 | 6/2005 | Leonosky | 375/232 |
| 6,912,250 B1 | 6/2005 | Adireddy et al. | 375/232 |
| 6,931,052 B2 | 8/2005 | Fuller et al. | 375/144 |
| 6,947,481 B1 | 9/2005 | Citta et al. | 375/232 |
| 6,947,506 B2 | 9/2005 | Mills | 375/346 |
| 6,956,893 B2* | 10/2005 | Frank et al. | 375/147 |
| 6,959,065 B2 | 10/2005 | Sparrman et al. | 376/349 |
| 6,963,546 B2 | 11/2005 | Misra et al. | 370/294 |
| 6,975,669 B2 | 12/2005 | Ling et al. | 375/141 |
| 6,975,671 B2 | 12/2005 | Sindhushayana et al. | 375/144 |
| 6,986,069 B2 | 1/2006 | Chaudhuri et al. | 714/780 |
| 6,993,070 B1 | 1/2006 | Berthet et al. | 675/232 |
| 6,996,385 B2 | 2/2006 | Messier et al. | 455/226.3 |
| 7,020,175 B2 | 3/2006 | Frank | 375/130 |
| 7,035,316 B2 | 4/2006 | Smee et al. | 375/147 |
| 7,035,354 B2 | 4/2006 | Karnin et al. | 375/341 |
| 7,039,095 B2 | 5/2006 | Takahashi | 375/148 |
| 7,042,929 B2 | 5/2006 | Pan et al. | 375/148 |
| 7,051,268 B1 | 5/2006 | Sindhushayana et al. | 714/786 |
| 7,054,354 B2 | 5/2006 | Gorokhov et al. | 375/354 |
| 7,069,050 B2 | 6/2006 | Yoshida | 455/561.2 |
| 7,072,628 B2 | 7/2006 | Agashe et al. | 455/140 |
| 7,092,464 B2 | 8/2006 | Mills | 375/346 |
| 7,133,435 B2 | 11/2006 | Papasakellariou et al. | 375/148 |
| 7,209,511 B2 | 4/2007 | Dent | 375/148 |
| 7,298,805 B2 | 11/2007 | Walton et al. | 375/347 |
| 7,397,843 B2 | 7/2008 | Grant et al. | 375/148 |
| 7,535,969 B2 | 5/2009 | Catreux et al. | 375/267 |
| 7,623,602 B2 | 11/2009 | Guess et al. | 375/347 |
| 7,668,125 B2* | 2/2010 | Kadous | 370/310 |
| 7,711,075 B2 | 5/2010 | Guess | 375/346 |
| 7,733,941 B2 | 6/2010 | McCloud et al. | 375/148 |
| 7,826,516 B2 | 11/2010 | Guess | 375/148 |
| 2001/0017883 A1 | 8/2001 | Tirola et al. | 375/148 |
| 2001/0053143 A1 | 12/2001 | Li et al. | 370/344 |
| 2002/0009156 A1 | 1/2002 | Hottinen et al. | 375/267 |
| 2002/0060999 A1 | 5/2002 | Ma et al. | 370/335 |
| 2002/0118781 A1 | 8/2002 | Thomas et al. | 375/347 |
| 2002/0131534 A1 | 9/2002 | Ariyoshi et al. | 375/233 |
| 2002/0154717 A1 | 10/2002 | Shima et al. | 375/349 |
| 2002/0159507 A1 | 10/2002 | Flaig et al. | 375/148 |
| 2003/0005009 A1 | 1/2003 | Usman | 708/322 |
| 2003/0012264 A1 | 1/2003 | Papasakellariou et al. | 375/148 |
| 2003/0035469 A1 | 2/2003 | Frank et al. | 375/150 |
| 2003/0086479 A1 | 5/2003 | Naguib | 375/144 |
| 2003/0095590 A1 | 5/2003 | Fuller et al. | 375/148 |
| 2003/0156630 A1 | 8/2003 | Sriram et al. | 375/148 |
| 2003/0210667 A1 | 11/2003 | Zhengdi | 370/335 |
| 2003/0219085 A1 | 11/2003 | Endres et al. | 375/350 |
| 2004/0001537 A1 | 1/2004 | Zhang et al. | 375/229 |
| 2004/0008765 A1 | 1/2004 | Chung et al. | 375/233 |
| 2004/0013190 A1 | 1/2004 | Jayaraman et al. | 375/233 |
| 2004/0076224 A1 | 4/2004 | Onggosanusi et al. | 375/144 |
| 2004/0095907 A1 | 5/2004 | Agee et al. | 340/334 |
| 2004/0116073 A1 | 6/2004 | Rooyen et al. | 455/101 |
| 2004/0146024 A1 | 7/2004 | Li et al. | 370/334 |
| 2004/0161065 A1 | 8/2004 | Buckley et al. | 375/350 |
| 2004/0165675 A1 | 8/2004 | Ito et al. | 375/267 |
| 2004/0190601 A1 | 9/2004 | Papadimitriou et al. | 375/148 |
| 2004/0196892 A1 | 10/2004 | Reznik | 375/148 |
| 2004/0248515 A1 | 12/2004 | Shteiman | 455/63.1 |
| 2004/0264552 A1 | 12/2004 | Smee et al. | 375/147 |
| 2005/0002445 A1 | 1/2005 | Dunyak et al. | 375/148 |
| 2005/0013349 A1 | 1/2005 | Chae et al. | 375/148 |
| 2005/0084045 A1 | 4/2005 | Stewart et al. | 375/350 |
| 2005/0101259 A1 | 5/2005 | Tong et al. | 455/69 |
| 2005/0111408 A1 | 5/2005 | Skillermark et al. | 370/331 |
| 2005/0129107 A1 | 6/2005 | Park et al. | 375/233 |
| 2005/0152267 A1 | 7/2005 | Song et al. | 370/210 |
| 2005/0157811 A1 | 7/2005 | Bjerke et al. | 375/267 |
| 2005/0163196 A1 | 7/2005 | Currivan et al. | 375/144 |
| 2005/0180364 A1 | 8/2005 | Nagarajan et al. | 370/335 |
| 2005/0185729 A1 | 8/2005 | Mills | 341/50 |
| 2005/0190868 A1 | 9/2005 | Khandekar et al. | 375/346 |
| 2005/0195889 A1 | 9/2005 | Grant et al. | 375/148 |
| 2005/0213529 A1 | 9/2005 | Chow et al. | 370/320 |
| 2005/0223049 A1 | 10/2005 | Regis | 708/300 |
| 2005/0243908 A1 | 11/2005 | Heo et al. | 375/233 |
| 2005/0259770 A1 | 11/2005 | Chen | 348/346 |
| 2005/0265465 A1 | 12/2005 | Hosur et al. | 375/260 |
| 2006/0007895 A1 | 1/2006 | Coralli et al. | 370/335 |
| 2006/0013289 A1 | 1/2006 | Hwang | 375/148 |
| 2006/0047842 A1 | 3/2006 | McElwain | 709/231 |
| 2006/0078042 A1 | 4/2006 | Lee et al. | 375/148 |
| 2006/0125689 A1 | 6/2006 | Narayan et al. | 375/347 |
| 2006/0126703 A1 | 6/2006 | Karna | 375/147 |
| 2006/0141933 A1 | 6/2006 | Smee et al. | 455/63.1 |
| 2006/0141934 A1 | 6/2006 | Pfister et al. | 455/63.1 |
| 2006/0141935 A1 | 6/2006 | Hou et al. | 455/63.1 |
| 2006/0142041 A1 | 6/2006 | Tomasin et al. | 455/522 |
| 2006/0153283 A1 | 7/2006 | Scharf et al. | 375/148 |
| 2006/0215781 A1 | 9/2006 | Lee et al. | 375/267 |
| 2006/0227909 A1 | 10/2006 | Thomas et al. | 375/346 |
| 2006/0229051 A1 | 10/2006 | Narayan et al. | 455/296 |
| 2006/0245509 A1 | 11/2006 | Khan et al. | 375/260 |
| 2007/0153935 A1 | 7/2007 | Yang et al. | 375/267 |

FOREIGN PATENT DOCUMENTS

| | | |
|---|---|---|
| WO | WO 01/89107 | 11/2001 |
| WO | WO 02/080432 | 10/2002 |

OTHER PUBLICATIONS

Response to Non-Final Office-Action dated May 13, 2010 re U.S. Appl. No. 11/491,674.

Wang, Xiaodong et al., "Space-Time Multiuser Detection in Multipath CDMA Channels", IEEE Transactions on Signal Processing, vol. 47, No. 9, Sep. 1999, pp. 2356-2374. 19 Pages.

Marinkovic, Slavica et al., "Space-Time Iterative and Multistage Receiver Structures for CDMA Mobile Communications Systems", IEEE Journal on Selected Areas in Communications, vol. 19, No. 8, Aug. 2001 pp. 1594-1604.11 Pages.

Jayaweera, Sudharman K. et al., "A Rake-Based Iterative Receiver for Space-Time Block-Coded Multipath CDMA", IEEE Transactions on Signal Processing, vol. 52, No. 3, Mar. 2004 pp. 796-806. 11 Pages.

Mohamed, Nermin A. et al., "A Low-Complexity Combined Antenna Array and Interference Cancellation DS-CDMA Receiver in Multipath Fading Channels", IEEE Journal on Selected Areas in Communications, vol. 20, No. 2, Feb. 2002. pp. 248-256. 9 Pages.

Information Disclosure Statement re U.S. Appl. No. 11/491,674 submitted May 13, 2010. 2 Pages.

Response submitted May 12, 2010 to Notice to File corrected Application Papers mailed Apr. 7, 2010 re U.S. Appl. No. 12/731,915. 99 Pages.

Guo, Dongning, Rasmussen, Lars K., and Lim, Teng Joon, "Linear Parallel Interference Cancellation in Long-Code CDMA," IEEE Journal on Selected Areas in Communications, Dec. 1999, pp. 2074-2081, vol. 17, No. 12. 8 pages.

Guo, Dongning, Rasmussen, Lars K., Sun, Sumei, Lim, Teng J., and Cheah, Christopher, "MMSE-Based Linear Parallel Interference Cancellation in CDMA," IEEE Proceedings, 0-7803-4281-X/97, Sep. 1998, pp. 917-921. 5 pages.

Rasmussen, Lars K. and Oppermann, Ian J., "Convergence Behaviour of Linear Parallel Cancellation in CDMA," IEEE Global Telecom. Conf. (San Antonio, Texas), Dec. 2001, pp. 3148-3152. 5 pages.

Guo, Dongning, Rasmussen, Lars K., Sun, Sumei, and Lim, Teng J., "A Matrix-Algebraic Approach to Linear Parallel Interference Cancellation in CDMA," IEEE Transactions on Communications, Jan. 2000, pp. 152-161, vol. 48, No. 1. 10 pages.

Rasmussen, Lars K. and Oppermann, Ian J., "Ping-Pong Effects in Linear Parallel Interference Cancellation for CDMA," IEEE Transactions on Wireless Communications, Mar. 2003, pp. 357-363, vol. 2, No. 2. 7 pages.

Lin, Tao and Rasmussen, Lars K., "Iterative Multiuser Decoding with Maximal Ratio Combining," Australian Workshop on Communication Theory, (Newcastle, Australia), Feb. 2004, pp. 42-46. 6 pages.

Lin, Tao and Rasmussen, Lars K., "Truncated Maximal Ratio Combining for Iterative Multiuser Decoding," Australian Workshop on Communication Theory, (Brisbane, Australia), Feb. 2005. 6 pages.

Wang, Xiaodong and Poor, H. Vincent, "Iterative (Turbo) Soft Interference Cancellation and Decoding for Coded CDMA," IEEE Transactions on Communications, Jul. 1999, pp. 1046-1061, vol. 47, No. 7. 16 pages.

Divsalar, Dariush, Simon, Marvin K., and Raphaeli, Dan, "Improved Parallel Interference Cancellation for CDMA," IEEE Transactions on Communications, Feb. 1998, pp. 258-268, vol. 46., No. 2. 11 pages.

Ali-Hackl, Markus, Freisleben, Stefan, Heddergott, Ralf, and Xu, Wen, "Error Vector Magnitude as a Figure of Merit for CDMA Receiver Design," The 5th European Wireless Conference, Jun. 2009. 7 pages.

Nagasawa, A. et al., "A Novel Backlight System With the Unified Component", IDW/AD '2005, vol. 12th, No. vol. 2, pp. 1285-1288. 4 pages.

Xue, Guoqiang, Weng, Jianfeng, Le-NGOC, Tho, Tahar, Sofiene, "Adaptive Multistage Parallel Interference Cancellation for CDMA," IEEE Journal on Selected Areas in Communications, Oct. 1999, vol. 17, No. 10. 13 pages.

Hooli, Kari, Juntti, Markku, Heikkila, Markku J., Komulainen, Petri, Latva-Aho, Matti, Lilleberg, Jorma, "Chip-Level Channel Equalization in WCDMA Downlink," EURASIP Journal on Applied Signal Processing 2002:8, pp. 757-770. 14 pages.

Rasmussen, Lars K., Lim, Teng J., Johansson, Ann-Louise, "A Matrix-Algebraic Approach to Successive Interference Cancellation in CDMA," IEEE Transactions on Communications, Jan. 2000, vol. 48, No. 1, pp. 145-151. 7 pages.

Tan, Peng H. and Rasmussen, Lars H., "Linear Interference Cancellation in CDMA Based on Iterative Techniques for Linear Equation Systems," IEEE Transactions on Communications, Dec. 2000, vol. 48, No. 12, pp. 2099-2108. 10 pages.

Yener, Aylin, Yates, Roy D., and Ulukus, Sennur, "CDMA Multiuser Detection: A Nonlinear Programming Approach," IEEE Transactions on Communications, Jun. 2002, vol. 50, No. 6, pp. 1016-1024. 9 pages.

Persson, Anders, Ottosson, Tony, and Strom, Erik, "Time-Frequency Localized CDMA for Downlink Multi-Carrier Systems," IEEE 7th Int. Symp. on Spread-Spectrum Tech. & Appl., Sep. 2-5, 2002, vol. 1, pp. 118-122. 5 pages.

Ping, He, Tjhung, Tjeng Thiang, Rasmussen, Lars K., "Decision-Feedback Blind Adaptive Multiuser Detector for Synchronous CDMA System," IEEE Transactions on Vehicular Technology, Jan. 2000, vol. 49, No. 1, pp. 159-166. 8 pages.

Dai, Huaiyu and Poor, H. Vincent, "Iterative Space-Time Processing for Multiuser Detection in Multipath CDMA Channels," IEEE Transactions on Signal Processing, Sep. 2002, vol. 50, No. 6, pp. 2116-2127. 12 pages.

Guo, Yuanbin, "Advanced MIMO-CDMA Receiver for Interference Suppression: Algorithms, System-on-Chip Architectures and Design Methodology," PhD Thesis, Rice University, May 2005, pp. 165-186. 27 pages.

Naidu, Prabhakar S., "Modern Digital Signal Processing: An Introduction," Alpha Science International Ltd., UK, Copyright 2003, pp. 124-126. 6 pages.

Response dated Jan. 5, 2010 re Notice of Non-Compliant Amendment re U.S. Appl. No. 11/451,685. 2 Pages.

Amendment and Response to Office Action with mail date of Jun. 4, 2009 re U.S. Appl. No. 11/451,685, submitted on Nov. 29, 2009. 17 pages.

Response with mail date of Jun. 4, 2009, re U.S. Appl. No. 11/451,685.

PCT Notification of Transmittal of International Search Report and Written Opinion of International Searching Authority date of mailing Sep. 21, 2007, re Int'l Application No. PCT/US 06/36018. 10 pages.

Non-Final Office Action with mail date of Mar. 23, 2009 for U.S. Appl. No. 11/451,688.

Non-Final Office Action with mail date of Apr. 3, 2009 for U.S. Appl. No. 11/451,932.

International Search Report, dated Apr. 26, 2007, in PCT Application No. US06/42036. 2 pages.

Nambiar, Rajiv and Goldsmith, Andrea, "Iterative Weighted Interference Cancellation for CDMA Systems with RAKE Reception," Feb. 1999 IEEE 49th, vol. 2, pp. 1232-1236. 5 pages.

Bejide, Emmanuel O. And Takawira, F., "An Iterative Multiuser Detector for DS-CDMA Systems in Multipath Fading Channels," IEEE Communications Society, Mar. 2004, pp. 54-59. 6 pages.

Notification of Transmittal of International Search Report and Written Opinion of the International Searching Authority with mail date of Apr. 26, 2007 re PCT/US2006/042036 filed on Oct. 30, 2006, with documents citations. 3 pages.

Information Disclosure Statement submitted Sep. 6, 2010 for Control U.S. Appl. No. 11/452,027 with Filing Date of Jun. 13, 2006. 9 Pages.

Proakis, John G., "Digital Communications," McGraw-Hill, 4th edition, 2000, pp. 622-626, 956-959. 10 pages.

Verdu, Sergio, "Multiuser Detection," Cambridge University Press, New York, NY, 1998, pp. 291-306. 18 pages.

Kim, Seong Rag, Choi, In-Kyeong, Kang, Sugbong, Lee, Jeong Goo, "Adaptive Weighted Parallel Interference Cancellation for CDMA Systems," Electronic Letters, Oct. 29, 1998, V34, No. 22. 2 pages.

Response to Office Action Summary dated Jun. 29, 2006, mail date Jun. 11, 2009, re U.S. Appl. No. 11/479,401.

Information Disclosure Statement submitted Nov. 21, 2007 for Control U.S. Appl. No. 11/475,458 with Filing Date of Aug. 28, 2006. 3 pages.

Response to Office Action Summary dated Jun. 27, 2006, mail date Aug. 17, 2009, re U.S. Appl. No. 11/475,458.

Sayed, Ali H., "Fundamentals of Adaptive Filtering," John Wiley & Sons, Inc. Hoboken, NJ, Jun. 2003, pp. 170-171, 174, 187. 7 pages.

Office Action dated Mar. 25, 2010, with mail date of Sep. 28, 2010, re U.S. Appl. No. 12/731,960.

Office Action dated Mar. 25, 2010, with mail date of Aug. 30, 2010, re U.S. Appl. No. 12/731,779.

Office Action dated Apr. 28, 2007, with mail date of Aug. 30, 2010, re U.S. Appl. No. 12/769,510.

Notice of Allowance and Fee(s) due with mail date Nov. 5, 2010, re U.S. Appl. No. 11/451,685. 11 Pages.

Non Final Office Action dated Dec. 15, 2009 re U.S. Appl. No. 11/491,674, filed on Jul. 24, 2006. 7 Pages.

Non Final Office Action dated Jun. 4, 2009 re U.S. Appl. No. 11/451,685, filed Jun. 13, 2006. 2 Pages.

Non Final Office Action dated Jun. 11, 2009 re U.S. Appl. No. 11/479,401, filed Jun. 29, 2006. 6 Pages.

Non Final Office Action dated Aug. 17, 2009 re U.S. Appl. No. 11/475,458, filed Aug. 28, 2006. 13 Pages.

Notice of Appeal submitted Feb. 23, 2010 by Appellant(s) on Jan. 27, 2010 re U.S. Appl. No. 10/993,046. 43 Pages.

Notice of Allowance and Fee(s) Due with mail date of Mar. 21, 2011 re U.S. Appl. No. 11/451,685. 12 Pages.

Preliminary Amendment dated Mar. 30, 2011 re U.S. Appl. No. 12/731,915. 19 Pages.

Office Action dated Jun. 28, 2011 for U.S. Appl. No. 11/451,685 re signed and dated Form 1449. 2 Pages.

Office Action dated Jun. 23, 2011 re U.S. Appl. No. 12/916,389. 16 Pages.

PCT Preliminary Report on Patentability dated May 20, 2008 for PCT/US2006/42036 filed on Oct. 30, 2006. 2 Pages.

PCT Preliminary Report on Patentability dated Mar. 26, 2008 for Intl. Application No. PCT/US2006/36018 includes Written Opinion. 5 Pages.

* cited by examiner excellent# ITERATIVE INTERFERENCE CANCELLATION FOR MIMO-OFDM RECEIVERS

CROSS-REFERENCE TO RELATED APPLICATIONS

This application is a continuation of U.S. patent application Ser. No. 11/475,458 filed Aug. 28, 2006, now abandoned which claims priority to U.S. Patent Application Ser. No. 60/736,204, filed Nov. 15, 2005, entitled "Iterative Interference Cancellation Using Mixed Feedback Weights and Stabilizing Step Sizes," and referred to as the TCOMM-IIC patent application, the contents of both of which are incorporated herein by reference.

BACKGROUND

1. Field of the Invention

The present invention relates generally to iterative interference cancellation in received wireless communication signals and, more particularly, to cancellation of interference in a MIMO-OFDM system.

2. Discussion of the Related Art

In an exemplary wireless multiple-access system, a communication resource is divided into separable subchannels, and a set of such subchannels is allocated to different users. For example, subchannels may include time slots, frequency slots, multiple-access codes, spatio-temporal subchannels, or any combination thereof. A plurality of subchannel signals received by a wireless terminal (e.g., a subscriber unit or a base station) may carry symbols for different users or may carry symbols for a single user.

If a single transmitter broadcasts different messages to different receivers, such as a base station in a wireless communication system broadcasting to a plurality of mobile terminals, the channel resource is subdivided in order to distinguish between messages intended for each mobile. Thus, each mobile terminal, by knowing its allocated subchannel(s), may decode messages intended for it from the superposition of received signals. Similarly, a base station typically separates signals it receives into subchannels in order to differentiate between users.

In a multipath environment, received signals are superpositions of time delayed (and complex scaled) versions of the transmitted signals. Multipath generally introduces interference both across a transmitted information signal (inter-symbol interference) and across adjacent transmitted signals (multiple-access interference). This effect can be viewed in the frequency domain as a frequency dependent attenuation, termed frequency selective fading. The level and phase of the fading are generally approximately constant across narrow bands of frequency, the maximum width of which is termed the coherence bandwidth of the channel.

When orthogonal frequency division multiplexing (OFDM) is employed as a transmission scheme, the available frequency band is divided into several subbands. If the subband spacing is sufficiently small relative to the coherence bandwidth characterizing the carrier frequency and propagation environment it is possible to treat each subband as a frequency-nonselective fading channel. This allows, among other things, for a relatively simple per tone equalizer to be employed and for efficient mapping of access rates to each subband. Furthermore, the different subcarriers can be assigned to different users to allow for interference-free transmission through OFDM-multiple access (OFDMA).

When multiple transmit and/or receive antennas are employed at the communication devices, the channel becomes a multiple-input multiple-output (MIMO) channel, and the extra degrees of freedom may be exploited to derive a rate increase (multiplexing gain) and/or an increase in redundancy (diversity gain) to allow for a higher reliability in the data transmission. These benefits are gained at the expense of an increase in the transmitter and the receiver complexity as the signals from the various transmit antennas generally mix in the physical channel. A transmitter side approach to mitigating this phenomenon is to weight the transmitter signals so that they add constructively at the receive antenna array (termed beamforming). A receiver approach is to employ a receiver matched to the propagation conditions to separate the information transmitted across the transmit array. Oftentimes, a combination of these approaches is employed.

The use of the linear minimum mean squared error (LMMSE) criterion for MIMO detection is a well-established technique. The mean squared error is measured between the transmitted data and the output of an LMMSIE processor. The mean squared error is generally a function of the spectral characteristics of the multipath fading channel and the multiplexing signal set employed for a user (i.e. the carrier(s) allocated for that user). When frequency domain spreading is employed in the transmission, the linear model may become quite large in dimensionality, as high as the product MNP where M transmit antennas are employed to transmit data across P subcarriers to a receiver employing N receive antennas. In such a case, a suboptimal approach would be to independently perform an LMMSE front end on each subcarrier, followed by a single dispreading operation.

The use of an efficient receiver architecture, such as the iterative interference canceller detailed in TCOM-IIC patent application, circumvents the complexity of performing the full matrix inverse required by the LMMSE approach. When mixed decisions on the transmitted data are employed within the cancellation loops, a further performance improvement may be realized over the LMMSE receiver.

In order to circumvent the need for the matrix inverse inherent in the LMMSE receiver, various soft iterative interference-cancellation techniques have been studied. The term soft cancellation is used in reference to a receiver that does not exploit information about the finite size of user constellations. Soft interference cancellers are motivated by well-known techniques of quadratic minimization that employ serial and/or parallel iterations.

In a MIMO system, the constellation employed at each layer of transmission may be known (in a single user space-time system) and/or estimated (when multi-user spatial multiplexing is employed). In such cases, it is possible to employ nonlinear parallel or serial interference cancellation (PIG or SIC, respectively), wherein hard decisions can be made on sufficiently reliable user symbols with the hard decisions coming from the symbol constellation. Such a mixed-PIG approach can produce a significant performance improvement over the optimal LMMSE receiver. Furthermore, when the transmitted data is further spread across several frequency bands through the use of a linear transformation at the transmitter, linear receivers such as the LMMSE are known to suffer performance degradations over nonlinear approaches. In particular they cannot achieve the diversity gains available through the frequency spreading.

Interleaving of the coded bits prior to modulation can buy back some of this performance, but requires very long interleaver depths to achieve the required diversity gain in frequency. A nonlinear receiver, such as the mixed decision PIG approach, may improve performance in such cases by exploiting additional diversity available at the modulated data level.

SUMMARY OF THE INVENTION

In view of the foregoing background, embodiments of the present invention may provide a generalized interference-canceling receiver for demultiplexing received MIMO-OFDM signals.

In one embodiment of the invention, an iterative interference cancellation system employed in an OFDMA-MIMO receiver is configured to separate a plurality of streams of independently encoded data in a received signal employing a common set of transmit antennas and frequency subbands. The iterative interference cancellation system comprises a soft-weighting means, a channel-mapping means, a subtraction means, a stabilizing step size means, a channel-matching means, and a mixed-decision means. In another embodiment, an iterative interference cancellation system employed in a space-time multiplexed receiver comprises a soft-weighting means, a channel-mapping means, a subtraction means, a stabilizing step size means, a channel-matching means, and a mixed-decision means.

The soft-weighting means is configured for applying weights to each of a plurality of input symbol estimates for an initial iteration, and to each of a plurality of updated symbol estimates for at least one subsequent iteration for producing a plurality of weighted symbol estimates. The soft-weighting means may include, by way of example, but without limitation, any combination of hardware and software configured to calculate symbol weights from a function employing a merit of at least one input symbol decision. The merit may comprise an average ratio of signal power to interference-plus-noise power (or a function thereof). In another embodiment, the merit may be a function of input symbol decisions and proximity of those input symbol decisions to a nearby constellation point. The soft-weighting means may employ time-series averaging for calculating the proximity as a statistical average. In yet another embodiment, the soft-weighting means may include a signal-processing means configured to perform statistical signal processing for estimating the average ratio of signal power to interference-plus-noise power. Such statistical signal processing may employ error-vector magnitude calculations.

The channel-mapping means is configured for employing a signal basis for all symbol sources in the channel to synthesize constituent signals from the plurality of weighted symbol estimates. The channel-mapping means may combine the constituent signals for producing a combined signal. The combined signal may be considered as approximating a received signal that would result from signals transmitted by at least one hypothetical transmitter configured to transmit signals synthesized from the plurality of weighted symbol estimates.

The channel-mapping means may include, by way of example, but without limitation, a signal processor or a set of elements of a transmitter configured to process symbol estimates for producing at least one modulated digital baseband signal, such as a signal that may be produced by a transmitter prior to up-conversion, amplification, and coupling into a communication channel. The channel-mapping means may include a space-frequency mapping function or a space-time mapping function.

The subtraction means is configured for subtracting the combined signal from the received signal to produce an error signal. The subtraction means may include, by way of example, but without limitation, an adder, a combiner, or any other device or method configured for subtracting a first set of signals from a second set of signals.

The stabilizing step size means is configured for scaling the error signal by a stabilizing step size to produce a scaled error signal. The stabilizing step size means may include, by way of example, but without limitation, any combination of hardware and software configured to scale an error signal with a scaling factor that may be used for controlling convergence in an iterative canceller. For example, the stabilizing step-size means may comprise a step size calculation means and a multiplier means for scaling an error signal with the step size.

The step size calculation means is configured for calculating a stabilizing step size having a magnitude that is a function of proximity of the input symbol decisions to a desired interference-cancelled symbol decision. The multiplier means is configured for scaling (e.g., multiplying) an error signal with the stabilizing step size. The step size calculation means may include, by way of example, but without limitation, software or programmable hardware configured for calculating a stabilizing step size.

The channel-matching means is configured for resolving the scaled error signal onto user space-frequency channel mapping functions to produce interference-cancelled symbol estimates. The channel-matching means may include, by way of example, but without limitation, a demapper.

The mixed-decision means is configured to perform a mixed decision comprising a hard decision or a soft decision on each of the interference-cancelled symbol estimates to produce the plurality of updated symbol estimates. The mixed-decision processing means may include, by way of example, but without limitation, a combination of hardware and software configured to produce soft and/or hard symbol estimates. The mixed-decision means comprises an optimal de-biasing means configured for scaling the input symbol estimates with a scale factor to remove bias computed on the input symbol estimates, and a processing means configured for processing each de-biased input symbol estimate, irrespective of other symbol estimates. The processing means produces a hard decision that quantizes the de-biased input symbol estimate onto a nearby constellation point, or a soft decision that scales the de-biased input symbol estimate.

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

These and other embodiments of the invention are described with respect to the figures and the following description of the preferred embodiments.

BRIEF DESCRIPTION OF THE DRAWINGS

Embodiments according to the present invention are understood with reference to the schematic block diagrams of FIGS. 1, 2A, 2B, 4, 5, 6, 7 and the flow diagram of FIG. 3.

Various functional elements or steps depicted in the figures may take the form of a microprocessor, digital signal processor, application specific integrated circuit, field programmable gate array, or other logic circuitry programmed or otherwise configured to operate as described herein. Accordingly, embodiments shown herein may take the form of programmable features executed by a common processor or a discrete hardware unit.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
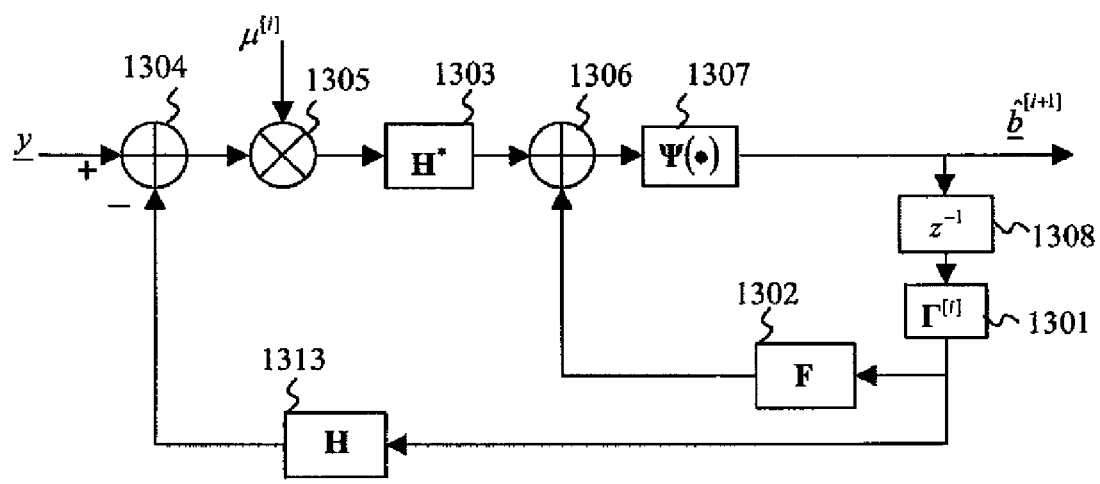
FIG. 1 shows an iterative interference canceller in accordance with one embodiment of the invention employing a steepest-decent solution.

FIG. 1 shows an iterative interference canceller in accordance with one embodiment of the invention employing a steepest-decent solution. Alternative embodiments may employ other techniques, such as serial interference cancellation, LMMSE, and conjugate-gradient approaches.

A subtraction module 1304 is configured to subtract input constituent values $\tilde{y}^{[i]}$ from a received baseband signal $y$ to produce a difference signal, or error signal, representing the difference between the received baseband signal and a synthesized estimate of the received baseband signal. A stabilizing step size module 1305 scales the difference signal by a stabilizing step size $\mu^{[i]}$. The stabilizing step size module 1305 may include a calculation module (not shown) configured to calculate a stabilizing step size having a magnitude that is a function of the proximity of the input symbol decisions to a desired interference-cancelled symbol decision.

The scaled difference signal $\mu^{[i]}(y-\tilde{y}^{[i]})$ is processed with a channel matching matrix $H^*$ 1303. The elements of $H^*$ can be constructed at the receiver using channel estimates and knowledge of users' channel mapping employed to introduce spatial, space-frequency, or space-time correlation. Since a channel-matched signal is $q=H^*y$, the output of the channel-matching module 1303 is $\mu^{[i]}(\underline{y}-\tilde{y}^{[i]})$. A summing module 1306 sums the output of the channel-matching module 1303 with a product of weighted symbol estimates $\Gamma^{[i]}\hat{b}^{[i]}$ and an implementation matrix F. A mixed-decision module 1307 processes the output of the summing module 1306 to produce an updated symbol estimate $\hat{b}^{[i+1]}$, which may be output for additional processing or may be employed in a subsequent iteration of interference cancellation.

Symbol estimates $\hat{b}^{[i+1]}$ are delayed by a delay module 1308 so that symbol estimates from a previous iteration can be used to cancel interference and update symbol estimates for a current iteration. The delayed symbols are processed in a weighting module 1301, which applies a diagonal soft-weighting matrix $\Gamma^{[i]}$ to the delayed symbol vector. A channel-mapping module 1313 emulates channel effects and any transmitter side spreading to synthesize the measurement vector $\tilde{y}^{[i]}=H\Gamma^{[i]}\hat{b}^{[i]}$ that would have been produced by transmitted symbols $\hat{b}^{[i]}$. Thus, the output of the channel-matching module 1303 may be expressed by $\mu^{[i]}(q-R\Gamma^{[i]}\hat{b}^{[i]})$, where $R=H^*H$ is a positive semi-definite matrix whose elements are correlations between the users' received signals, including all transmitter and channel effects. Symbol estimates output by the mixed-decision module 1307 are expressed by the update equation $$\hat{\underline{b}}^{[i+1]} = \Psi\left\{\mu^{[i]}\left(q - R\Gamma^{[i]}\hat{\underline{b}}^{[i]}\right) + F\Gamma^{[i]}\hat{\underline{b}}^{[i]}\right\},$$

which produces an output $b=\hat{b}^{[M]}$, after a predetermined number of iterations of the update equation.

Each case in which the users' received signals are characterized by spatial, space-frequency, or space-time correlation introduces novel structure to one or more of the components employed for producing the user-correlation matrix R or its factors H and H*. The operator H is a synthesis operator that operates on a complex vector of symbol estimates to produce a vector of unresolved complex frequency domain samples, and the operator H* is an analysis operator that operates on a vector of unresolved frequency domain samples to produce a complex vector of symbol estimates.

In the case where spatial correlations occur between the received signals through transmit beamforming, synthesis performed by the channel-mapping module 1313 and analysis performed by the channel-matching module 1303 are configured to employ spatial beamforming operators and spatial channel-matching operators, respectively. If transmit-side spatial shaping (e.g., beam forming, or spatial pre-coding) is performed, spatial beamforming and channel matching operators employed at the receiver will comprise a function of the channel matrix and a transmit-side spatial channel-mapping operator. In the case where space-frequency correlations occur between the received signals, the channel-mapping module 1313 and channel-matching module 1303 are configured to employ a function of the channel matrix and a transmit-side space-frequency-spreading operator. In the case where space-time correlations occur between the received signals, the channel-mapping module 1313 and channel-matching module 1303 are configured to employ a function of the channel matrix and a transmit-side space-time operator. Embodiments of the invention may further provide for channel coding and decoding in the iterative interference cancellation process.

A MIMO-OFDMA transmitter codes symbol sequences from one or more users onto a transmitter array for transmission over a channel to a receiver array. The transmitter typically appends a cyclic prefix to the transmission signal such that the channel from each transmit antenna to each receive antenna is a flat-fading channel. Thus, each frequency sub-channel of the transmitted signal may be characterized by a memoryless matrix that maps transmissions from an M-element transmit array to an N-element receive array.

Figure 2A:
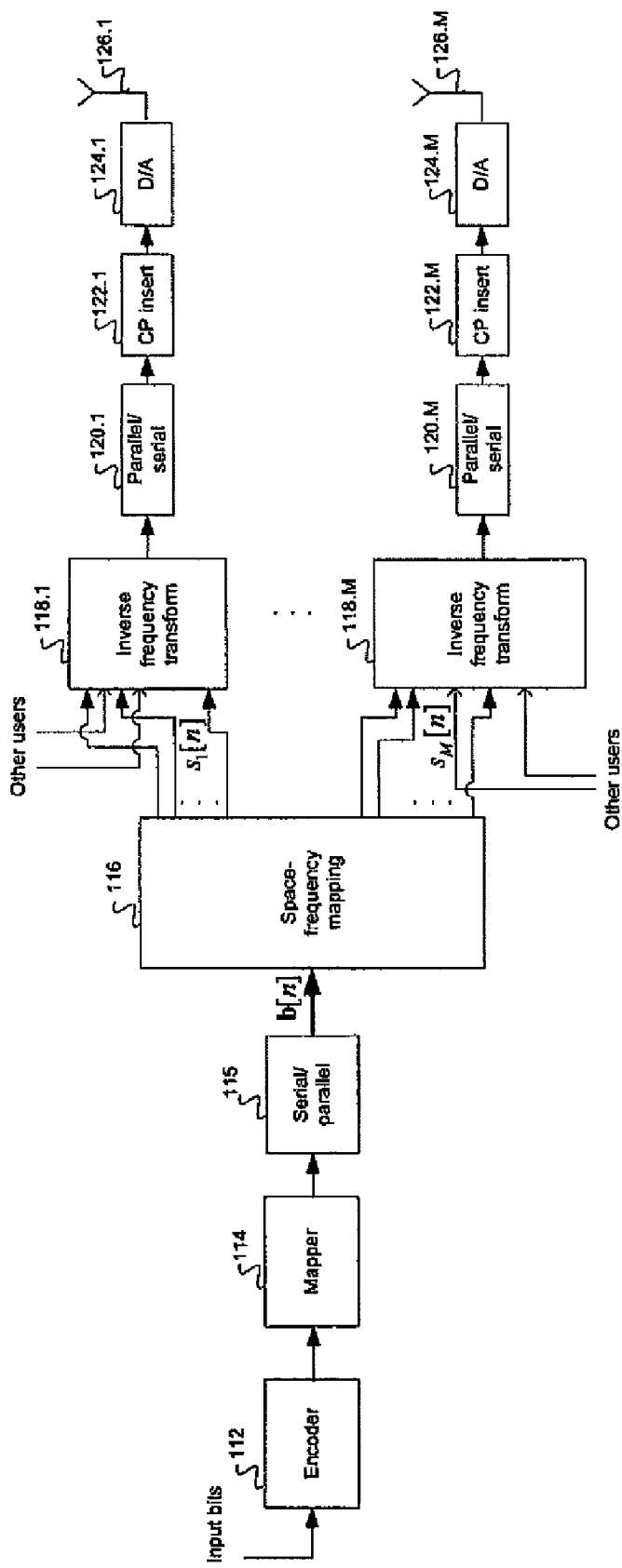
FIG. 2A is a block diagram of a MIMO-OFDMA transmitter in which all spatial dimensions are allocated to a single user.

In a specific embodiment shown in FIG. 2A, a MIMO-OFDMA transmitter includes an encoder 112, a constellation mapper 114, a serial-to-parallel buffer 115, a space-frequency mapper 116, an inverse frequency mapping function 118.1-118.M, a parallel to serial converter 120.1-120.M, a cyclic prefix insertion module 122.1-122.M, and a digital-to-analog converter 124.1-124.M to convert the digital samples to an analog waveform. The encoder 112 receives and codes the traffic data (i.e., the information bits) in accordance with a channel-coding scheme to produce coded bits, and additionally performs interleaving on the output code bits. The selected coding scheme may include any combination of cyclic redundancy check (CRC) coding, convolutional coding, Turbo coding, block coding, and the like. An encoding controller (not shown) may vary the encoding rate and code type. The interleaving is used to introduce time, frequency, and spatial diversity onto the coded bits.

The space-frequency mapping 116 creates a linear combination of the elements of the input modulation vector b[n] (the output of 115) to create a length MP element coded data vector $$s[n] = \begin{bmatrix} s_1[n] \\ M \\ s_M[n] \end{bmatrix} = Hb[n],$$

where b[n] is a symbol vector of dimension $K \leq MIP$. The length P sub-vectors of s[n], namely $s_m[n]$, are coupled to M OFDM modulators. The overall frequency-domain transmit vector for symbol n across antenna m is given by $$s_m[n] = \begin{bmatrix} s_m[1, n] \\ M \\ s_m[P, n] \end{bmatrix},$$

where $s_m[p,n]$ is the complex transmission for symbol n at frequency p from antenna m.

The space-frequency mapping function is implemented through the multiplication with the matrix H, and may also introduce spatial structure to the overall transmitted signal through any combination of beamforming, space-time coding, and frequency domain spreading. The length MP vector s[n] may be de-multiplexed in frequency, into its frequency domain components, so that for frequency p the M spatial components at the transmitter are $$s[p, n] = \begin{bmatrix} s_1[p, n] \\ M \\ s_M[p, n] \end{bmatrix}.$$

For example, in a BLAST system, the vector b[n] will have no more than MP elements and the mapping is simply the identity matrix assigning each set of P symbols in b[n] to a unique antenna and subband pair, i.e. s[n]=b[n]. If beamforming is employed on each subband (corresponding to a unique flat fading channel) then the length M output vector describing the symbols transmitted across the M antennas on subband P will have the form $$s[p, n] = \begin{bmatrix} s_1[p, n] \\ M \\ s_M[p, n] \end{bmatrix} = H_p b_p[n],$$

where $H_p$ is an M×Q matrix chosen to match the flat MIMO channel characterizing subband p and $b_p[n]$ is the length $K_p \leq M$ sub-vector of complex symbols mapped to this carrier across the M transmit antennas.

Finally, if frequency domain spreading is employed in the transmission independently at each antenna, or across all antennas jointly, we additionally have a linear combination of the various subband symbols (i.e., H will not generally have a sparse structure). In summary, this model is general enough to cover the various linear operations which may be employed in a transmitter operating in a closed loop feedback fashion (i.e. linear diversity mapping at the complex symbol level, beamforming, etc.) as well as frequency domain spreading, whether the latter is employed to increase the decoded performance or to decrease the transmitted peak to average power ratio to improve amplifier efficiency in the radio.

Each OFDM modulator comprises an inverse fast frequency transformation (for example an inverse fast Fourier transform if all or most of the frequency subbands are employed) 118.1-118.M which may act on a combination of several users' data allocated to different subcarriers, a parallel to serial converter 120.1-102.M, and a cyclic-prefix prepender (CP insert) 122.1-122.M. Each modulator is assigned to process a respective coded data stream for one of M transmit antennas of a transmitter array 126.1-126.M.

The symbol-mapping element 114 maps the received coded bits to modulation symbols. A modulation controller (not shown) may determine the particular modulation scheme implemented by each symbol-mapping element 114. For OFDM, the modulation may be achieved by grouping sets of q coded bits to form non-binary symbols followed by mapping each symbol to a specific point in a signal constellation corresponding to the selected modulation scheme (e.g., QPSK, M-PSK, M-QAM, or some other scheme).

The inverse frequency transforms 118.1-118.M convert each modulation symbol vector into a corresponding time-domain signal (which is referred to as an OFDM symbol vector). In one embodiment, each cyclic-prefix prepender 122.1-122.M repeats a portion of the OFDM symbol to form a corresponding transmission symbol vector. The cyclic prefix ensures that the transmission may be resolved onto orthogonal frequency subchannels in the presence of multi-path delay spread, thereby improving performance in frequency-selective channels and enabling a simple receiver structure. The transmission symbols with cyclic prefix are passed through a digital to analog converter 124.1-124.M, which performs any necessary transmit filtering, and coupled to an associated transmit antenna 126.1-126.M.

Figure 2B:
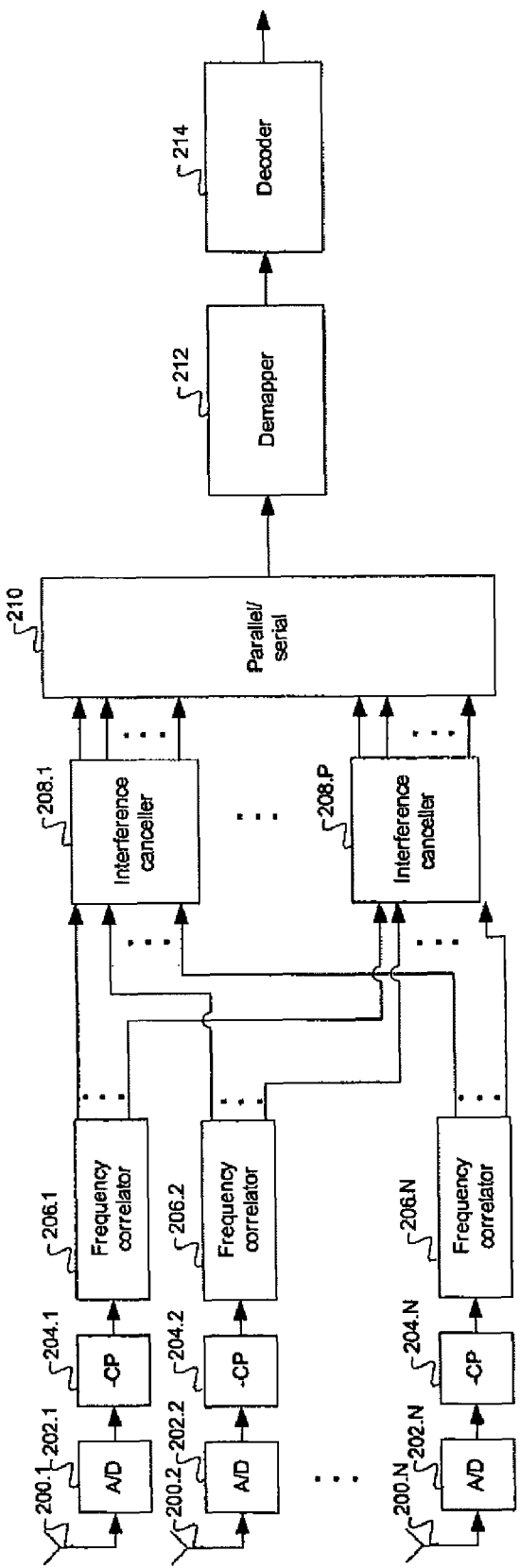
FIG. 2B is a block diagram of a receiver embodiment of the invention configured to operate in the absence of frequency correlation.

FIG. 2B is a block diagram of an embodiment of an OFDMA receiver configured to receive a data transmission from the transmitter shown in FIG. 2A when there is no frequency spreading introduced in the transmitter. A plurality of N receive antennas are employed 200.1-200.N to receive the signals transmitted from the M transmit antennas and passes each signal through an analog to digital converter 202.1-202.N (which may additionally perform any required receive pulse shaping filtering). The digital signals are passed through a cyclic prefix removal block 204.1-204.N and then through a frequency correlator block 206.1-206.N to produce P output frequency domain samples per antenna.

The cyclic-prefix removers (-CP) 204.1-204.N remove the cyclic prefix appended to each OFDM symbol by the transmitter in order to ensure ISI-free reception of the transmitted modulation symbols. The frequency correlators compute P samples of the discrete Fourier transform of each OFDM symbol, with the sampling position determined by the OFDMA mapping employed for the user of interest. When P is large relative to the total number of subcarriers employed in the system, the frequency correlators may be implemented through the fast Fourier transform (FFT). Such an implementation would be employed in a traditional OFDM system, where a single user employs all available subcarriers (i.e. there is no multiple access multiplexing in the frequency domain).

For each subcarrier employed by the user of interest, the frequency-domain outputs from the N individual receive antenna paths are collected into a vector and passed to an interference canceller 208.1-208.P. After interference cancellation, the data from all P subcarriers is converted to a serial stream 210 and passed through a demapper 212, which converts the data from the modulated signal domain to soft estimates of bit reliability (generally through a log likelihood ratio demapping) for use in the error-control decoder 214. The decoder 214 produces an estimate of the uncoded bit stream, and may additionally produce estimates of the reliability of these bits through extrinsic information generated in the decoding process and possibly also a cyclic redundancy check.

Figure 3:
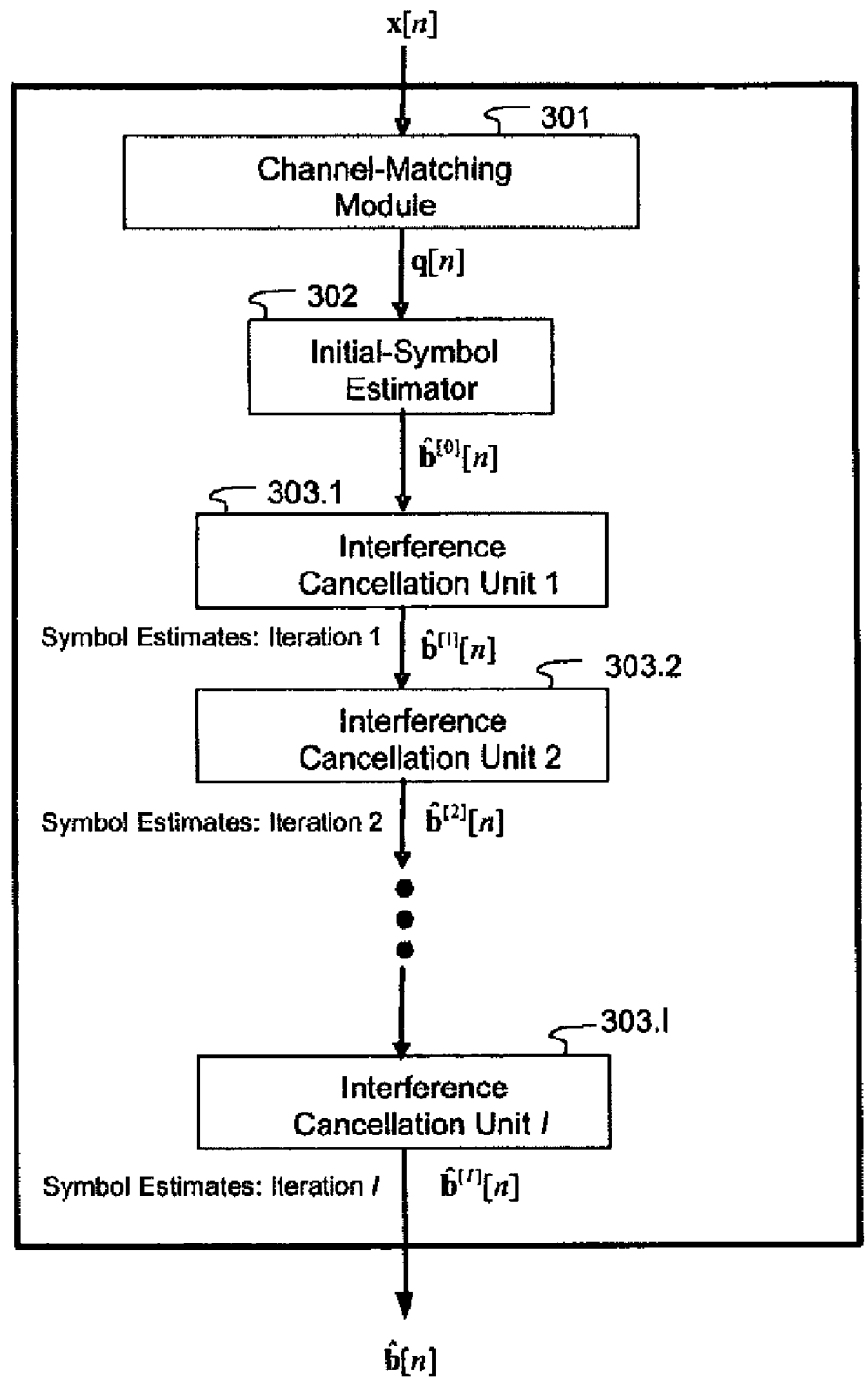
FIG. 3 is a flow diagram of a general iterative interference canceller.

Having described the general structure of the receiver, we now give more detail on the interference canceller block 208.1-208.P which is structurally common to all receiver embodiments described in this disclosure. An embodiment of an interference canceller is illustrated in FIG. 3, and consists of several parts. The data, $x_p[n]$, entering the interference canceller corresponding to the $n^{th}$ transmitted symbol is formed from the outputs of frequency correlators and has the linear model $$x_p[n]=H_p b_p[n]+w_p[n], \quad \text{Equation 1}$$

where $b_p[n]$ is a dimension $K_p \leq M$ vector of complex modulated data transmitted across the frequency band under consideration, $w_p[n]$ is zero mean additive noise with correlation matrix $\sigma^2 I$, and $H_p$ is the composite channel matrix consisting of the product of the actual flat MIMO channel linking the transmit and receive antennas and the space-frequency mapping performed at the transmitter across subband p, that is $$H_p = F_p \Theta_p,$$

where $\Theta_p$ is the $M \times K_p$ mapping matrix for subband p and $F_p$ is the $N \times M$ transfer matrix linking the transmit and receive arrays at subband p. This vector is first passed through a channel-matching module 301 to create a symmetric linear model for the channel. The output of the channel matching block, q[n], has the linear model $$q[n]=R_p b[n]+v[n],$$

where $R_p = H^*_p H_p$, $H^*_p$ is the complex conjugate transpose of the matrix $H_p$, and $v[n]=H^*_p w[n]$ is additive noise with correlation matrix $\sigma^2 R_p$. An optimal detection strategy for this model would minimize the quadratic form $$(q[n]-R_p b[n])^* R^{-1}_p (q[n]-R_p b[n]) \quad \text{Equation 2}$$

over all possible input symbol vectors b[n]. Generally speaking, a receiver attempts to determine a prior set of probabilities on the coded bits comprising the symbol vector b[n] for use in an error control decoder. This problem is solved in practice by first determining a "good" estimate of the symbol vector b[n], and then determining a set of likelihood ratios for the bits comprising the symbols through a demapper 212. To form an estimate of the symbol vector, one may attempt to minimize the quadratic form of Equation 2 under some relaxed set of constraints.

The channel-matched vector q[n] is processed by an initial-symbol estimator 302 to form initial estimates of the transmitted data b[n] which are passed through a sequence of interference cancellation units (ICUs) 303.1-303.1 to form successively improved symbol estimates. The ICUs 303.1-303.1 solve (or approximately solve) the Normal Equation $q[n]=(R_p+\sigma^2 I)[n]$.

The functionality contained in the initial symbol estimation block and the ICUs are described in detail in the TCOMM-IIC patent application, the contents of which are included here by reference. The various functions of these units, soft weighting, mixed decisions, debiasing, and stabilizing step sizes are employed in the same manner as described in the TCOM-IIC patent application. In an OFDMA system, the ICU may estimate the per channel signal to interference plus noise ratios (SINRs) with the aid of 1) pilot symbols embedded in the frequency domain transmit data, 2) with training sequences sent in a preamble, postamble, or midamble of a packetized OFDMA transmission, or 3) through an error vector magnitude (EVM) measurement system acting on the constellation data. Such techniques of estimation are clear to one skilled in the art of OFDMA system design and the resulting estimates are generally available in standard receivers as they are necessary for the log likelihood ratio estimation performed in the demapper functional block 212.

The interference canceller is a K input, L output vector-mapping module that removes the effects of the composite channel formed from the transmit space-frequency mapping and the physical fading channel on the transmitted modulated data. For the transmitter embodiment shown in FIG. 2A with no frequency correlation (spreading) introduced in the spatial-frequency mapping, it is possible to assign one of P ICUs to each employed frequency subband, as there is no additional correlation introduced across the subbands at the modulation symbol level (additional correlation is generally present at the coded bit level due to both the encoding structure and any additional interleaving). Alternative embodiments of the interference cancellation module may employ other techniques, such as serial interference cancellation, linear minimum mean squared estimation, and conjugate gradient approaches, so long as the input is x[n] and the output is b[n].

Figure 4:
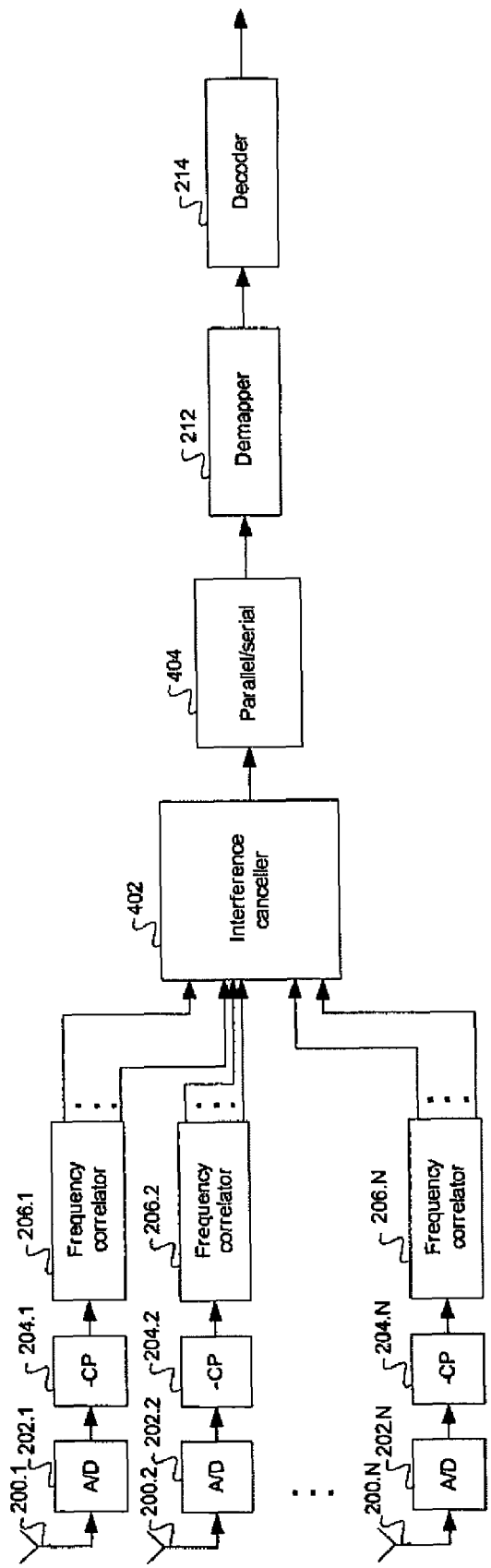
FIG. 4 is a block diagram of a receiver embodiment of the invention configured to operate in the absence of frequency correlation.

In FIG. 4, an embodiment of a receiver designed to operate with the OFDMA transmitter illustrated in FIG. 2A is shown where the transmitter additionally introduces frequency correlation amongst the transmitted data, typically through the application of a frequency domain spreading matrix in the space-frequency mapping module 116. In this case, all NP of the frequency correlator outputs are mapped to a single interference canceller, which is configured to perform cancellation over the composite channel which now includes several frequency subbands in its structure, due to the spreading in the transmit antenna mapper. Specifically, the frequency domain channel model has the form $$x[n]=H_{ms}b[n]+w[n],$$

where $H_{ms}$ is the composite multi-stream channel matrix with model $$H_{ms}=\text{diag}\{F_1,K,F_p\}\Phi.$$

In this model the subbands are correlated through the matrix $\Phi$, which includes any space-frequency mapping and an outer spreading matrix so that it is not block diagonal (note that if it were block diagonal, the receiver embodiment illustrated in FIG. 2B could be employed). The interference canceller now acts on the matrix $H_{ms}$ to form estimates of the data vector b[n] and the other steps in the receiver are identical to those of FIG. 2. In particular the channel matched symbol vector q[n] is formed and the quadratic form $$(q[n]-R_{ms}b[n])^* R^{-1}_{ms}(q[n]-R_{ms}b[n]) \qquad \text{Equation 3}$$

is minimized, where $R_{ms}=H_{ms}H_{ms}$.

Figure 5:
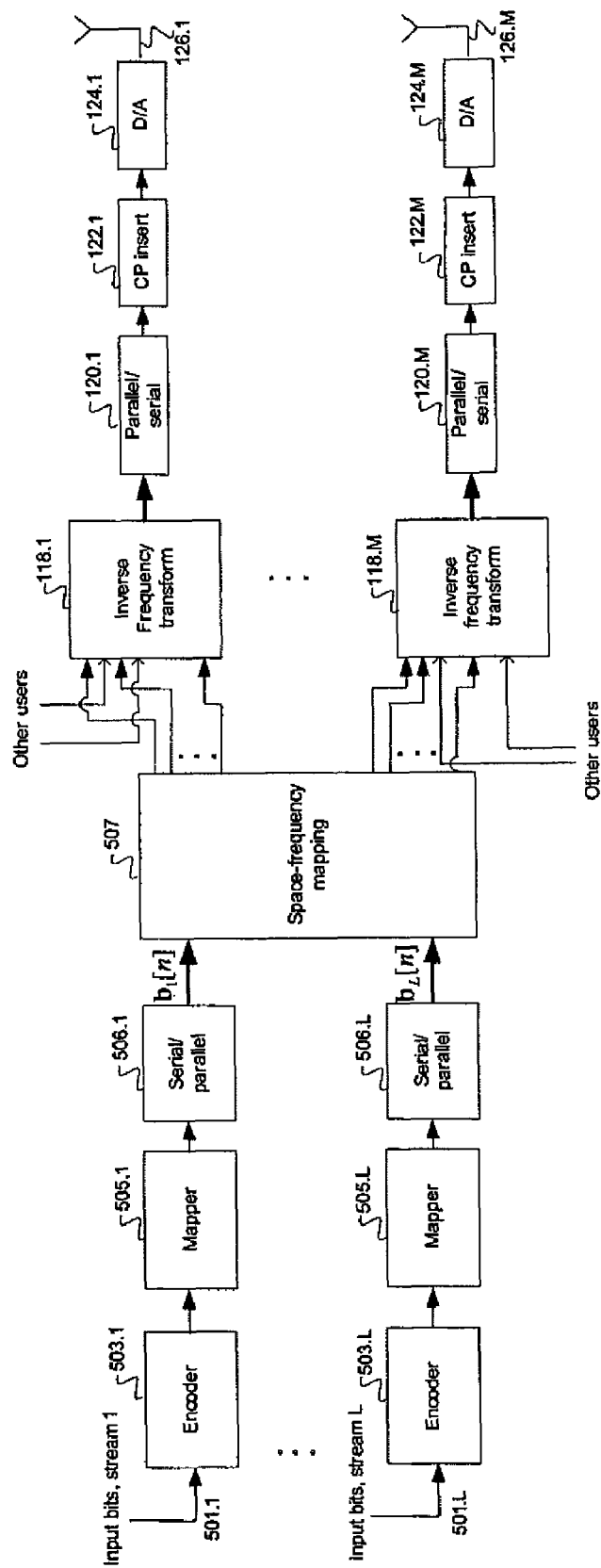
FIG. 5 is a block diagram of a transmitter configured to employ spatial multiplexing across one or more OFDM sub-bands.
Figure 6:
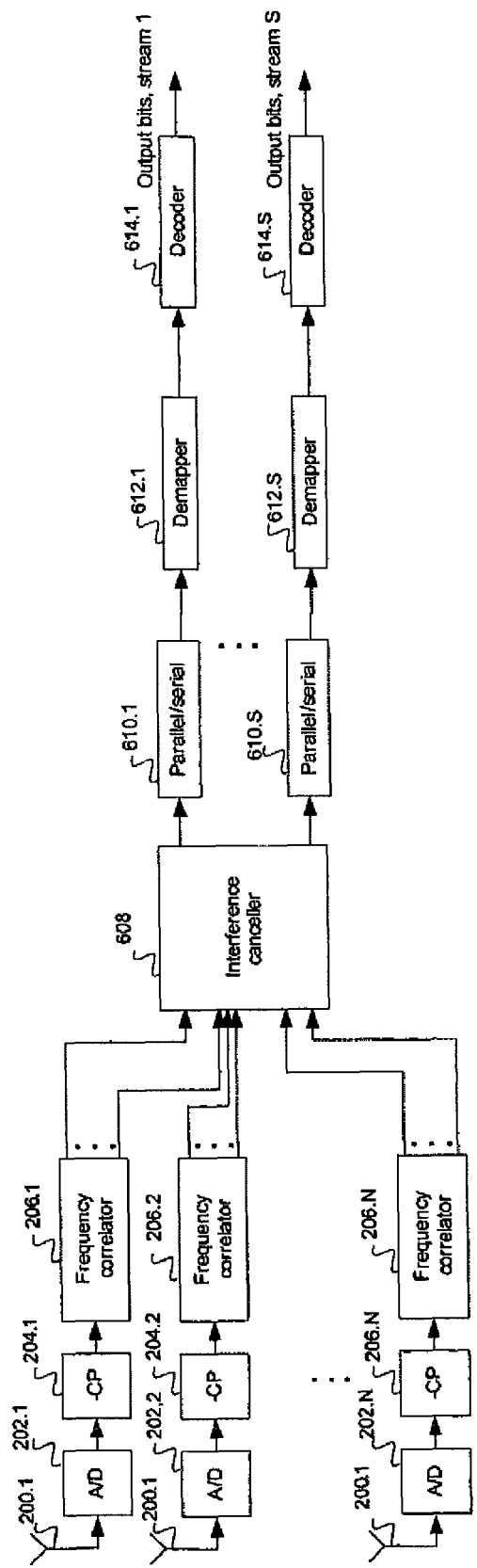
FIG. 6 is a block diagram of a receiver embodiment of the invention configured to operate in the presence of spatial multiplexing in a parallel manner.

In FIG. 5, a multilayered OFDMA transmitter is illustrated for a particular user of interest. L different sequences of information bits 501.1-501L enter the L transmitter front ends. The streams may be associated with one or more users, possibly by a serial to parallel operation prior to the transmitter. Each stream is encoded 503.1-503.L according to some predetermined rate $r_l$, the set of rates being generally chosen to optimize the overall spatial sum rate under a constraint on the receiver formulation. The encoded bits are then mapped to constellation points 505.1-505L (again the various branches may employ different modulation sets), these encoded symbol streams are then passed through a serial to parallel converter 506.1-506L to produce the input vectors to the space-frequency mapping block 507. The L symbol streams are then mapped to the PM spatial frequency pairs by the application of a space-frequency mapping function 507 which may contain any combination of beamforming, redundancy (diversity mapping), and spreading. The remainder of the transmit chain is identical to that of FIG. 2A, the user data is inverse transformed 118.1-118.M, possibly together with other user data lying on different subbands. This data is passed through a parallel to serial converter In FIG. 6 a multiple antenna receiver embodiment is illustrated for use with the layered transmitter of FIG. 5. The front end of this receiver is identical to that of FIG. 2, wherein analog to digital conversion 202.1-202.N is followed by a cyclic prefix removal 204.1-204.N, and finally a frequency correlator 206.1-206.N is employed to transform the data onto a multiplicity P of subbands. The composite linear model for the vector of data formed by joining the outputs of the frequency correlators 206.1-206.N obeys the linear model $$x[n]=H_{ms}b[n]+w[n],$$

where $H_{ms}$ is the composite multiple-stream channel matrix with model $$H_{ms}=\text{diag}\{F_1,K,F_p\}\Phi$$

The interference canceller 608 operates on this linear model to form estimates of the input constellation vector b[n], the components of which are converted to S serial streams 610.1-610.S, wherein the $S \geq L$ streams correspond to those transmission layers employed by the particular user at the receiver. These streams are passed through the corresponding demappers 612.1-612.S and error control decoders 614.1-614.S, where the demapping and decoding is matched to the corresponding code and modulation rates for the user of interest. Notice that the data corresponding to streams assigned to other users in a spatial multiplexing system are not decoded in this receiver, although they are employed at the modulation level in the interference canceller.

Figure 7:
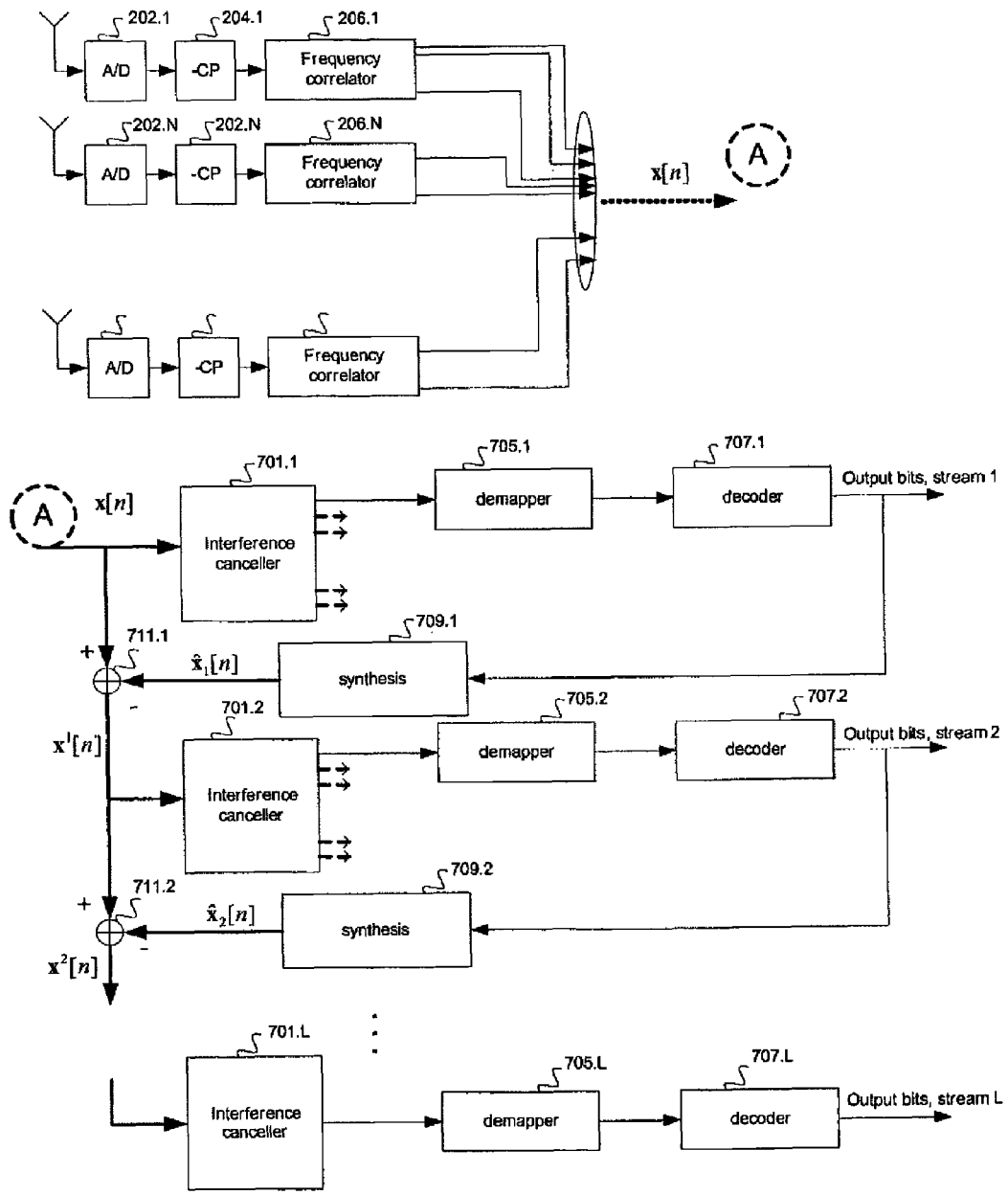
FIG. 7 is a block diagram of a receiver embodiment of the invention configured to operate in the presence of spatial multiplexing with successive decoding and cancellation of the constituent space-frequency layers.

In FIG. 7, an alternative receiver is illustrated for the transmitter of FIG. 5. The receiver of FIG. 7 employs modulation level interference cancellation in a successive decoder. The front end processing is identical to that presented in the previous receiver figures, including the analog to digital conversion, the cyclic prefix removal and the frequency correlation. At this stage the data obeys the linear model $$x[n]=H_{ms}b[n]+w[n],$$

where $H_{ms}$ is the composite multi-stream channel matrix with model $H_{ms}=\text{diag}\{F_1,K,F_p\}\Phi$. The sequence of measurements x[n] is passed through the iterative interference cancellation block 701.1 configured with respect to $H_{ms}$. The output sequence of this block corresponding to the first stream of data is passed through a demapper 705.1 and an error-control decoder 707.1 to produce an estimate of the input information sequence. This sequence is then passed through a synthesis block 709.1 which re-encodes and remaps the data in the same fashion as the transmitter (i.e. blocks 503.1 and 505.1 in FIG. 5), the output of which is an estimate of the contribution to x[n] due to the data corresponding to the first layer, denoted $\hat{x}_1[n]$. This output is then subtracted from x[n] by a subtraction module 711.1 to form a new sequence x′[n] that obeys the linear model $$x'[n]=H'_{ms}b'[n]+w[n],$$

where $H'_{ms}$ is the composite channel matrix with all columns corresponding to the layer-one modulation symbols removed, and b′[n] is the corresponding vector of modulation symbols with those terms corresponding to the first layer removed. This new sequence is then passed through an interference canceller 701.2 matched to the updated lower rank linear model corresponding to x′[n] and this process is repeated until either 1) the last layer corresponding to the user of interest has been decoded or 2) the final layer of the system has been decoded. If the process continues through the final layer, and this final layer can be described by a single column vector, i.e. if $$x^L[n]=h^L_{ms}b^L[n]+w[n],$$

where $h^L_{ms}$ is a vector, then the interference canceller may be replaced by the appropriate minimum mean squared error vector processor. The most general transmission system will not satisfy this condition, however, and in the case it is not satisfied an interference canceller would be employed.

It is clear that this method may be realized in hardware or software and there are several modifications that can be made to the order of operations and structural flow of the processing. Those skilled in the art should recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, MATLAB™, Verilog, VHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

The functions of the various elements shown in the drawings, including functional blocks labeled as "modules" may be provided through the use of dedicated hardware, as well as hardware capable of executing software in association with appropriate software. These functions may be performed by a single dedicated processor, by a shared processor, or by a plurality of individual processors, some of which may be shared. Moreover, explicit use of the term "processor" or "module" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope.

For example, a MIMO-Spread spectrum transmitter and receiver may code symbol sequences from one or more users onto a transmitter array for transmission over a channel to a receiver array. The transmitter would typically code the symbols across spread-spectrum subchannels and multiple antennas. The space-time coding and the frequency-selective space-time channel introduce correlation across subchannels and receive antennas, and this correlation must be accounted for in the iterative interference canceller, such as previously described.

Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. An iterative interference canceller comprising:
a soft-weighting module configured for applying soft weights to each of a plurality of input symbol estimates for an initial iteration, and to each of a plurality of updated symbol estimates for at least one subsequent iteration for producing a plurality of weighted symbol estimates,
a channel-mapping module configured for synthesizing constituent signals from the plurality of weighted symbol estimates, and producing a combined signal therefrom,
a subtraction module configured for subtracting the combined signal from a received signal to produce an error signal,
a stabilizing step size module configured for scaling the error signal by a stabilizing step size to produce a scaled error signal,
a channel-matching module configured for resolving the scaled error signal onto user space-frequency channel mapping functions to produce interference-cancelled symbol estimates, and
a mixed-decision module configured for performing a mixed decision comprising a hard decision or a soft decision on each of the interference-cancelled symbol estimates to produce the plurality of updated symbol estimates;
wherein the canceller is employed in a space-time multiplexed receiver whereby a plurality of streams of independently encoded data in a received signal employing a common set of transmit antennas and temporal subbands are separated, and
whereby the channel-mapping module and the channel-matching module are further configured to process frequency correlations introduced by transmitter space-frequency mapping.

2. The canceller recited in claim 1, wherein the canceller is employed in a OFDMA-MIMO receiver whereby a plurality of streams of independently encoded data in a received signal employing a common set of transmit antennas and frequency subbands are separated.

3. The canceller recited in claim 1, further configured to process each of a plurality of frequency subbands dedicated to a user of interest.

4. The canceller recited in claim 1, wherein the canceller is further configured to employ a steepest-descent iterative approximation to Normal Equations of LMMSE filtering for space-frequency filtering.

5. The canceller recited in claim 1, wherein the canceller is further configured to employ a conjugate gradient iterative approximation to Normal Equations of LMMSE filtering for space-frequency filtering.

6. The canceller recited in claim 1, further comprising a successive decoding architecture to separate the plurality of streams of independently encoded data.

7. The canceller recited in claim 1, whereby the temporal subbands comprise coded modulations.

8. The canceller recited in claim 1, whereby the channel-mapping module and the channel-matching module are further configured to process spatial and temporal structure introduced by a transmitter space-time mapping and a frequency-selective wireless channel.

9. An iterative interference cancellation method comprising:
providing for applying a soft weight to each of a plurality of input symbol estimates for an initial iteration, and to each of a plurality of updated symbol estimates for at least one subsequent iteration for producing a plurality of weighted symbol estimates,
providing for channel mapping the plurality of weighted symbol estimates to synthesize constituent signals, and producing a combined signal therefrom,
providing for subtracting the combined signal from a received signal to produce an error signal,
providing for scaling the error signal by a stabilizing step size to produce a scaled error signal,
providing for channel matching the scaled error signal onto user space-frequency channel mapping functions to produce interference-cancelled symbol estimates, and providing for performing a mixed decision comprising a hard decision or a soft decision on each of the interference-cancelled symbol estimates to produce the plurality of updated symbol estimates, whereby providing for channel mapping and providing for channel matching further comprises processing frequency correlations introduced by transmitter space-frequency mapping.

10. The method of recited in claim 9, wherein the method is employed with a plurality of streams of independently encoded data in a received OFDMA-MIMO signal employing a common set of transmit antennas and frequency subbands and wherein said streams of independently encoded data are separated.

11. The method recited in claim 9, further comprising processing each of a plurality of frequency subbands dedicated to a user of interest.

12. The method recited in claim 9, further comprising employing a steepest-descent iterative approximation to Normal Equations of LMMSE filtering for space-frequency filtering.

13. The method recited in claim 9, further comprising employing a conjugate gradient iterative approximation to Normal Equations of LMMSE filtering for space-frequency filtering.

14. The method recited in claim 9, further comprising providing for successive decoding to separate the plurality of streams of independently encoded data.

15. An iterative interference cancellation method comprising:
providing for applying a soft weight to each of a plurality of input symbol estimates for an initial iteration, and to each of a plurality of updated symbol estimates for at least one subsequent iteration for producing a plurality of weighted symbol estimates,
providing for channel mapping the plurality of weighted symbol estimates to synthesize constituent signals, and producing a combined signal therefrom,
providing for subtracting the combined signal from a received signal to produce an error signal,
providing for scaling the error signal by a stabilizing step size to produce a scaled error signal,
providing for channel matching the scaled error signal onto user space-frequency channel mapping functions to produce interference-cancelled symbol estimates, and
providing for performing a mixed decision comprising a hard decision or a soft decision on each of the interference-cancelled symbol estimates to produce the plurality of updated symbol estimates,
wherein the method is employed with a plurality of streams of independently encoded data in a received space-time multiplexed signal employing a common set of transmit antennas and temporal subbands and wherein said streams of independently encoded data are separated,
whereby providing for channel mapping and providing for channel matching further comprises processing spatial and temporal structure introduced by a transmitter space-time mapping and a frequency-selective wireless channel.

16. The method recited in claim 5, whereby the temporal subbands comprise coded modulations.

17. The method recited in claim 15, further comprising processing each of a plurality of temporal subbands dedicated to a user of interest.

18. The method recited in claim 15, further comprising processing a plurality of temporal subbands dedicated to a user of interest.

19. A space-frequency receiver configured to separate a plurality of streams of independently encoded data in a received signal employing a common set of transmit antennas and frequency subbands, the space-frequency receiver comprising:
an iterative interference canceller configured to process an input signal comprising a plurality of independently encoded data streams, the iterative interference canceller comprising:
a soft-weighting module configured for applying soft weights to each of a plurality of input symbol estimates for an initial iteration, and to each of a plurality of updated symbol estimates for at least one subsequent iteration for producing a plurality of weighted symbol estimates,
a channel-mapping module configured for synthesizing constituent signals from the plurality of weighted symbol estimates, and producing a combined signal therefrom,
a subtraction module configured for subtracting the combined signal from the received signal to produce an error signal,
a stabilizing step size module configured for scaling the error signal by a stabilizing step size to produce a scaled error signal,
a channel-matching module configured for resolving the scaled error signal onto user space-frequency channel mapping functions to produce interference-cancelled symbol estimates, and
a mixed-decision module configured for performing a mixed decision comprising a hard decision or a soft decision on each of the interference-cancelled symbol estimates to produce the plurality of updated symbol estimates, and
a successive decoder, comprising:
a demapper and a decoder configured to process the plurality of updated symbol estimates for producing an estimated data stream for one of the plurality of independently encoded data streams,
a synthesis module configured for re-encoding and remapping the estimated input information sequence for producing its estimated contribution to the received signal, and
a second subtraction module configured for subtracting the estimated contribution from the received signal for producing an updated input signal comprising one less than the plurality of independently encoded data streams, for coupling back to the iterative interference canceller, wherein the iterative interference canceller is configurable for processing the updated input signal until the updated input signal comprises only one independently encoded data stream.

20. The receiver recited in claim 19, whereby the channel-mapping module and the channel-matching module are further configured to process frequency correlations introduced by transmitter space-frequency mapping.

21. The receiver recited in claim 19, further configured to process each of a plurality of frequency subbands dedicated to a user of interest.

22. The receiver recited in claim 19, wherein the canceller is further configured to employ a steepest-descent iterative approximation to Normal Equations of LMMSE filtering for space-frequency filtering.

23. The receiver recited in claim 19, wherein the canceller is further configured to employ a conjugate gradient iterative approximation to the Normal Equations of LMMSE filtering for space-frequency filtering.

24. The receiver recited in claim 19, further comprising a successive decoding architecture to separate the plurality of streams of independently encoded data.

25. A space-time receiver configured to separate a plurality of streams of independently encoded data in a received signal employing a common set of transmit antennas and temporal subbands, the space-time receiver comprising:
- an iterative interference canceller configured to process an input signal comprising a plurality of independently encoded data streams, the iterative interference canceller comprising:
  - a soft-weighting module configured for applying soft weights to each of a plurality of input symbol estimates for an initial iteration, and to each of a plurality of updated symbol estimates for at least one subsequent iteration for producing a plurality of weighted symbol estimates,
  - a channel-mapping module configured for synthesizing constituent signals from the plurality of weighted symbol estimates, and producing a combined signal therefrom,
  - a subtraction module configured for subtracting the combined signal from the received signal to produce an error signal,
  - a stabilizing step size module configured for scaling the error signal by a stabilizing step size to produce a scaled error signal,
  - a channel-matching module configured for resolving the scaled error signal onto user space-time channel mapping functions to produce interference-cancelled symbol estimates, and a mixed-decision module configured for performing a mixed decision comprising a hard decision or a soft decision on each of the interference-cancelled symbol estimates to produce the plurality of updated symbol estimates, and
- a successive decoder, comprising:
  - a demapper and a decoder configured to process the plurality of updated symbol estimates for producing an estimated data stream for one of the plurality of independently encoded data streams,
  - a synthesis module configured for re-encoding and remapping the estimated input information sequence for producing its estimated contribution to the received signal, and
  - a second subtraction module configured for subtracting the estimated contribution from the received signal for producing an updated input signal comprising one less than the plurality of independently encoded data streams, for coupling back to the iterative interference canceller, wherein the iterative interference canceller is configurable for processing the updated input signal until the updated input signal comprises only one independently encoded data stream.

26. The receiver recited in claim 25, whereby the channel-mapping module and the channel-matching module are further configured to process time-domain correlations introduced by transmitter space-time mapping.

27. The receiver recited in claim 25, further configured to process each of a plurality of temporal subbands dedicated to a user of interest.

28. The receiver recited in claim 25, wherein the canceller is further configured to employ a steepest-descent iterative approximation to Normal Equations of LMMSE filtering for space-time filtering.

29. The receiver recited in claim 25, wherein the canceller is further configured to employ a conjugate gradient iterative approximation to the Normal Equations of LMMSE filtering for space-time filtering.

30. The receiver recited in claim 25, further comprising a successive decoding architecture to separate the plurality of streams of independently encoded data.

* * * * *